W. R. ROBINSON.
Improvement in Cultivators.
No. 130,869.                                     Patented Aug. 27, 1872.
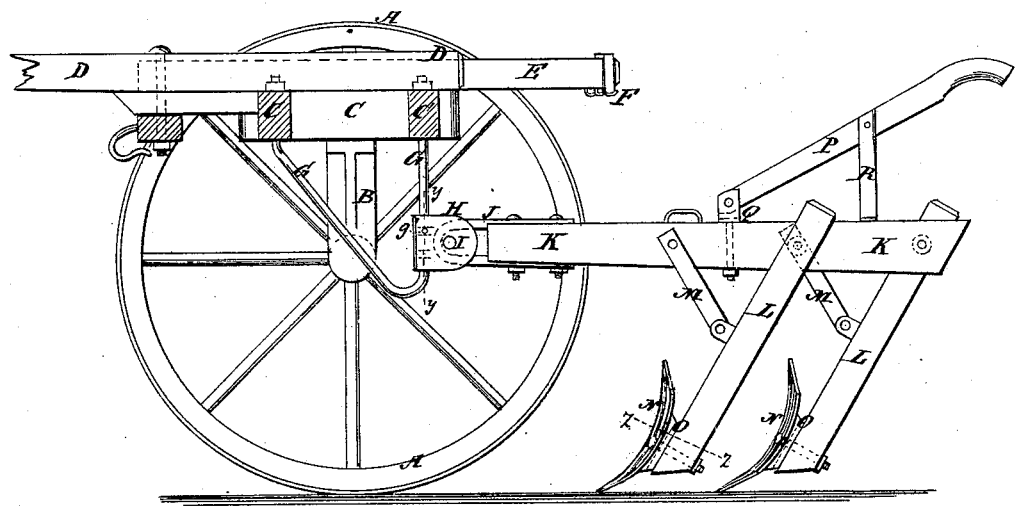
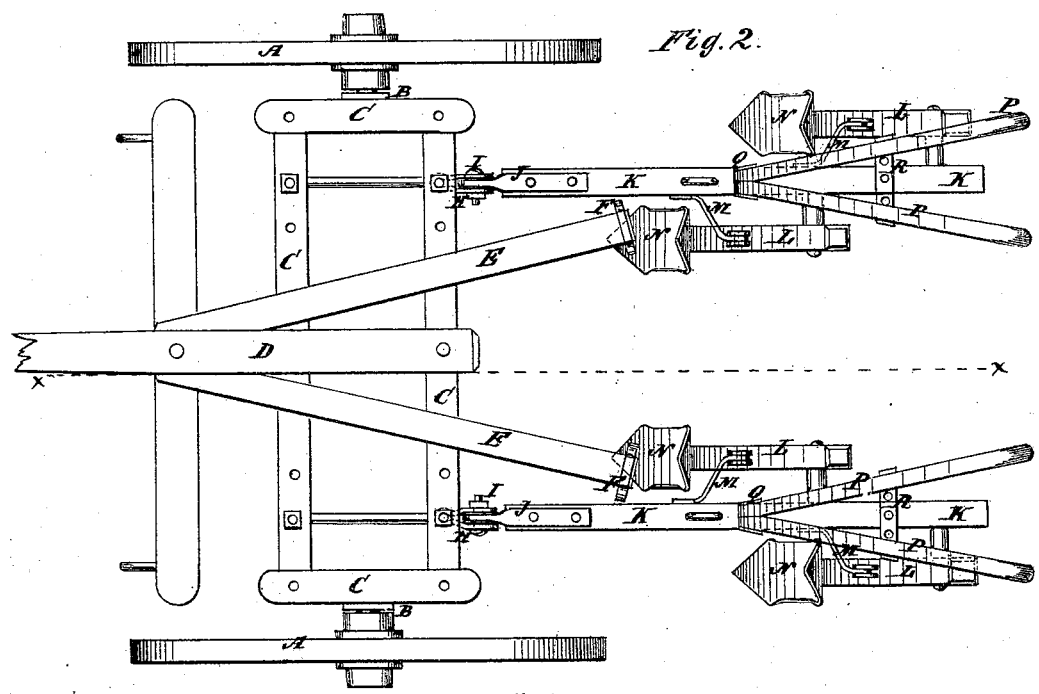
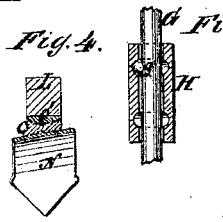
Witnesses:
E. Wolff
W. A. Graham
Inventor:
W. R. Robinson
per ———
Attorneys.

UNITED STATES PATENT OFFICE.

WILLIAM R. ROBINSON, OF MATTOON, ILLINOIS.

IMPROVEMENT IN CULTIVATORS.

Specification forming part of Letters Patent No. 130,869, dated August 27, 1872.

Specification describing a new and Improved Corn and Cotton Cultivator, invented by WILLIAM R. ROBINSON, of Mattoon, in the county of Coles and State of Illinois.

Figure 1 is a detail vertical longitudinal section of my improved cultivator taken through the line $x\ x$, Fig. 2. Fig. 2 is a top view of the same. Fig. 3 is a detail sectional view of the coupling taken through the line $y\ y$, Fig. 1. Fig. 4 is a detail sectional view taken through the line $z\ z$, Fig. 1.

Similar letters of reference indicate corresponding parts.

My invention has for its object to furnish an improved cultivator for cultivating corn, cotton, and other plants, and which shall be simple in construction, convenient in use, and easily adjusted, according to the character of the work to be done; and it consists in the construction and combination of the various parts of the cultivator, as hereinafter more fully described.

A are the wheels, which revolve upon the journals of the axle B, which are bent at right angles, and the upper ends of which are attached to the middle parts of the short side-bars of the frame C. D is the tongue, which is securely attached to the middle parts of the cross-bars of the frame C. E are inclined bars attached to the cross-bars of the frame C or to the tongue D, and to the opposite sides of the rear ends of which are attached hooks F, upon which are hooked staples attached to the plow-beams to hold the plows suspended, when desired, for convenience in turning or in passing from place to place. G are bent bars or brackets, the rear arms of which are vertical, and their ends are passed through holes in the rear cross-bar of the frame C and secured by nuts. The forward arms of the brackets G are inclined, and their ends are passed through holes in the forward cross-bar of the frame C and are secured by nuts. Several sets of holes are formed in the cross-bars of the frame C to receive the arms of the brackets G, so that said brackets may be adjusted nearer to or further from the center of the machine, according to the size of the plants. H are wide clevises or plates, which are bent around the vertical arms of the brackets G, and have transverse grooves formed in their concave surfaces to receive a projection or stop, $g'$, formed upon the outer sides of the vertical arms of the brackets G, so as to hold the plates or clevises H securely at any height to which they may be adjusted.

By turning the open ends of the plates, straps, or clevises H toward the wheels the space between said open ends is brought opposite the stop $g'$, so that said plates or clevises may be moved up or down to adjust them to cause the plows to work at any desired depth in the ground. The open parts of the plates or clevises H are secured to each other by bolts I, which pass through them and through the loop of the open clevis J interposed between the open or end parts of said plates or clevises H. The open or loop clevises J are secured to the forward ends of the plow-beams K by bolts or pins in the ordinary manner. By this construction the plows are attached in the rear of the axles, so that the downward pressure of the plow-beams may be borne by the said axle, relieving the horses' necks from having to sustain such pressure. To the opposite sides of the rear part of the plow-beams K are secured the upper ends of the plow-standards L, blocks of such a thickness being interposed between said standard and beam as to bring the standards of each beam to a suitable distance apart. The draft strain upon the plow-standards L is sustained by the brace-rods or bars M, the forward ends of which are secured to the beams K and their rear ends to the standards L or to lugs attached to said standards by pins, as shown in Fig. 1. N are the plows, the upper and lower ends of which are made alike, so that when one end has become worn the plow may be reversed and the other end used with the same effect as a new plow. The plows N are bolted or riveted to cast-iron seats, O, which are secured to the standards L by a single bolt, which passes through a transverse slot in the said seats O and through the said standard L. The transverse slot in the seat O enables the plows to be adjusted to throw more or less soil to the plants, as may be desired. $o'$ are cast-iron blocks secured to the forward side of the lower ends of the standards L. The forward side of the blocks $o'$ are made convex to fit into the concaved rear side of the seat O, and thus firmly support said seat and at the same time relieve the bolt from much of the strain that it would otherwise have to bear. The concave surface of the seat O and the corresponding convex surface of the block o' should be notched or corrugated to fit and have a firm hold upon each other, however adjusted. The cultivator may be adjusted to throw the soil to either side by changing the plows from one standard to another. P are the handles, the forward ends of which are bolted to a step, Q, which is pivoted to the plow-beam K. The handles P are supported at the desired elevation by the brace-bar R, the ends of which are bolted to the said handles P. The middle part of the braces R is made flat to rest upon the upper side of the plow-beams K, and is secured to said beams by a bolt, several holes being formed in said flat or horizontal part to receive the said bolt to enable the handles to be inclined to either side or adjusted in line with the beams, as may be desired.

Having thus described my invention, I claim as new and desire to secure by Letters Patent—

The combination of the pivoted step Q and adjustable brace R with the handles P and beam K, substantially as herein shown and described, and for the purpose set forth.

WILLIAM R. ROBINSON.

Witnesses:
   THOS. J. LEE,
   CHARLES MASON.